United States Patent [19]
Burlis et al.

[11] 3,724,985
[45] Apr. 3, 1973

[54] EXTRUDING APPARATUS
[75] Inventors: Norbert W. Burlis, University City, Mo.; Joseph H. Corbett, Glens Falls, N.Y.
[73] Assignee: Sherwood Medical Industries Inc., St. Louis, Mo.
[22] Filed: Jan. 18, 1971
[21] Appl. No.: 107,117

[52] U.S. Cl. .................. 425/132, 425/217, 425/380
[51] Int. Cl. .............................................. B29d 23/04
[58] Field of Search ...................... 425/130–133, 244, 425/245, 380, 113, 217

[56] References Cited
UNITED STATES PATENTS

| 836,083 | 11/1906 | Bowley | 425/380 X |
| 3,143,583 | 8/1964 | Haugwitz | 425/113 X |
| 3,175,247 | 3/1965 | Morrison et al. | 425/113 X |
| 3,039,141 | 6/1962 | Bauer | 425/132 |
| 3,526,929 | 9/1970 | Coupland | 425/156 |

FOREIGN PATENTS OR APPLICATIONS

| 354,837 | 8/1931 | Great Britain | 425/131 |

Primary Examiner—J. Spencer Overholser
Assistant Examiner—David S. Safran
Attorney—Hofgren, Wegner, Allen, Stellman & McCord

[57] ABSTRACT

An extruding apparatus for producing tubing having different characteristics, e.g. physical, chemical and the like, along its axial length including two or more molten plastic material producers that feed different molten materials to an extruding die, one molten plastic material producer being an injection molding machine or an extruder in combination with an accumulator injector. The two molten plastic producers are controlled so that when one producer is delivering molten material to the die producing a first section of the tubing, the other producer is either not injecting or exhausting to reclaimable waste.

A selectively operable valve is provided for delivering the molten materials to the die from one of the two sources having a fast cut-off characteristic effected by providing the inlets to the valve, connected to each of the molten material sources, and the valve outlet, connected to the extruding die, on one diametral side of the valve to minimize the required valve movement in switching from one material source to the other. The valve is also provided with an exhaust for one of the inlets permitting that material to be reclaimed.

Also provided in another embodiment is an extruding apparatus having two extruders that feed different molten plastic materials to a die, there being provided an accumulator-injector in each of the conduits interconnecting the extruders with the die arranged and controlled so that when one extruder is delivering molten material to the die producing a first section of tubing, the first accumulator-injector in the conduit connecting the other extruder with the die withdraws molten plastic from that conduit. Thereafter, the first accumulator-injector injects the previously withdrawn molten material into the die, eliminating waste, while the second accumulator-injector withdraws the molten material emanating from its associated extruder. This cycle is reversed periodically to produce a tube having sections of different material without requiring a valve for draining the molten material from one of the extruders while the other feeds the die.

7 Claims, 2 Drawing Figures

INVENTORS
NORBERT W. BURLIS
JOSEPH H. CORBETT

BY *Hofgren, Wegner, Allen, Stellman & McCord*
ATTORNEYS

EXTRUDING APPARATUS

BACKGROUND OF THE PRESENT INVENTION

The present invention relates to the manufacture of plastic tubing and more particularly to the extrusion of tubing having different characteristics, such as physical, chemical or the like, along its axial length.

There are many applications particularly in the biomedical field where it is desirable to have tubing sections having different characteristics, such as different properties, and particularly sections differing in stiffness along the length of the tubing. For example, in constructing tubing for use in artificial kidney connections to the patient, it is desirable to have a tube with a stiff end and a flexible end. One method of constructing such a tube in the past has been to chemically remove the plasticizer from one end. Another method of making such a tube is to take two separate sections of different plastic tubes and fasten them together employing a suitable joining process. Neither of these methods has been completely satisfactory.

Moreover, in addition to these plastic products mentioned above it is desirable to construct tubing of other than plastic materials having different characteristics along its axial length, more particularly, sections constructed of different materials or the same material with different properties, such as tensile strength, ductility, etc.

The present application relates to an improvement over the tubing and extruding apparatus disclosed in our copending application Ser. No. 231,608, filed Mar. 3, 1972, which is a continuation of application Ser. No. 865,615 filed Oct. 13, 1969, assigned to the assignee of the present invention.

In this prior application there is disclosed an extruding apparatus including a composite extruding die, fed selectively by two extruders which deliver molten plastic materials. Each of these extruders is selectively connected to the die through programmed valves. When one of the extruders is connected to supply molten plastic to the die, the other extruder is connected to exhaust the molten plastic to reclaimable waste. By sequentially operating the valves a single tubing is produced having different integral plastic sections along its length.

It is a primary object of the present invention to provide an improved extruding apparatus over that disclosed in our prior application.

SUMMARY OF THE PRESENT INVENTION

In accordance with the present invention an extruding apparatus and method are provided relating to the extrusion of an extrudate having different materials along its axial length from a composite die that receives molten plastic material selectively from each of two molten plastic producing devices, at least one of which includes an injection device. By appropriately timing the injection device to inject its molten plastic material into the composite extrusion die, a continuous extrudate is produced from the die while minimizing the waste material resulting from the apparatus disclosed in our above cited copending application Ser. No. 231,608.

In the primary embodiments of the present invention an extruder supplies one plastic material through a valve to the extruding die and an injection molding machine or an extruder and accumulator-injector combination supplies the other plastic material through the valve to the extruding die. The ram cycle in the injection molding machine or a piston associated with the accumulator-injector when such is employed with an extruder in place of the injection molding machine, is timed with the shifting of the valve so that waste material is minimized. The valve basically serves the function of selectively porting one of the two molten plastic materials from the two sources to the extruding die. It is provided with an exhaust passage for the molten plastic material from the extruder so that waste material may be reclaimed. Moreover, each of the two inlets to the valve is positioned closely to the valve outlet so that a rotary valve member, provided within a housing containing the ports and the inlets, requires only a small rotary movement when switching the valve outlet from communication with one of the inlets to the other. This movement simultaneously switches the non-delivering inlet to its associated discharge port or passage.

According to another embodiment of the present invention two extruders feed a single composite extrusion die with an accumulator-injector provided in each of the conduits interconnecting the extruders and the die. These accumulator-injectors are piston and cylinder devices driven by suitable actuators so that when in the withdrawal stroke they draw molten plastic from the conduits into the accumulator cylinders. On the inject stroke with the accumulator-injector piston moving inward with respect to the cylinder, the molten plastic previously drawn into the cylinder is injected back into the conduit interconnecting the extruder and the composite die.

When one of the conduits is delivering molten plastic to the die, the accumulator-injector associated with the other extruder is in its withdrawal phase, withdrawing molten plastic into its cylinder at a rate sufficient to reduce the net flow of molten plastic from that extruder to the die to zero, if desired. Thus, the composite die is fed molten plastic from only one of the extruders without wasting material from the other extruder.

When that accumulator-injector reaches the end of its withdrawal phase, it reverses and begins injecting molten plastic into the composite die. At the same time the extruder associated with the accumulator-injector is also feeding the same material to the die. As this accumulator-injector is injecting molten plastic into the die, the accumulator-injector associated with the extruder that was initially feeding the die is in its withdrawal phase withdrawing into its cylinder the molten plastic produced by the associated extruder and reducing the net flow from that extruder to the die to zero, if desired.

Thus, it is seen that the accumulator-injectors in the above described embodiment or the injector-devices described in the primary embodiment above serve the function of eliminating or minimizing the waste associated with continuous extruding processes employing different plastic materials as described in our above cited application Ser. No. 231,608.

DETAILED DESCRIPTION OF THE PREFERRED EMBODIMENTS

Figure 1:
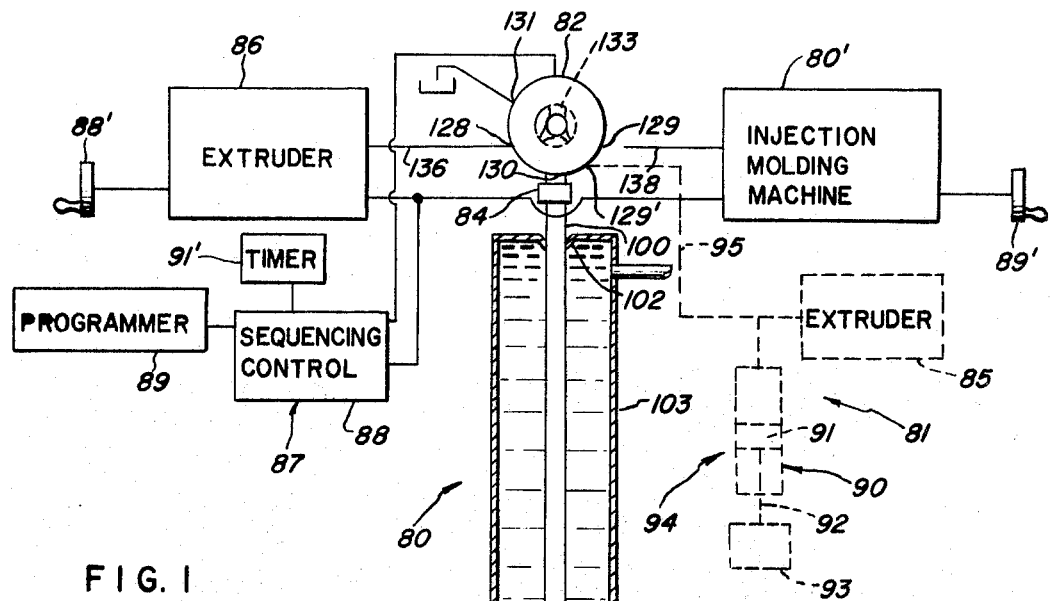
FIG. 1 is a schematic illustration of an extruding apparatus according to the present invention.

Referring to the primary embodiment illustrated in FIG. 1, an extruding apparatus 80 is illustrated adapted to provide a continuous tubing having varying characteristics along its axial length by extruding different plastics through a die into a single tube. The extruding apparatus 80 is seen to consist generally of an extruding die 84, and a valve 82 for selectively delivering the output from either extruder 86 or injection molding machine 80' to die 84. Instead of the injection molding machine 80', an extruder-accumulator device 81 may be provided as shown in dotted lines in FIG. 1.

The extruder-accumulator combination 81 consists of an extruder 85 having its output connected to an accumulator cylinder 90 of an injector-accumulator 94 having a piston 91 slidable therein and driven through rod 92 by an actuator 93. The injection molding machine 80' and the extruder-accumulator 81 provide similar functions in the present system since each provides periodic injections of molten plastic material, but they differ from conventional use in that the resulting product is a continuous extrusion.

The extruder 86 and injection molding machine 80' have their outputs controlled by control 87. The control 87 includes a sequencing control 88, a programmer 89, and a timer 91'.

The programmer 89 controls the speed of each of the molten plastic producers to determine the size of the tubing produced by controlling feed rate.

Timer 91' determines the length of time the valve 82 connects each of the molten plastic producers to deliver plastic to die 84. Sequencing control 88 functions to transfer programming data from the programmer 89 to the molten plastic producers at the proper time.

The extrudate 100 from die 84 takes a form as soon as it leaves the die orifice and passes through a flexible seal 102 into a cooling tank 103 where the extrudate cools and solidifies. At the other end of the extrudate tank 103 the extrudate is drawn by a take out device 104 which includes an endless belt 105 and rollers 106 that engage the opposite sides of the cooled extrudate in the form of tubing 110'. The resulting tubing may be severed at even intervals to produce tubing sections having a first portion of one plastic material and a second portion of another plastic material.

Valve 82 has inlet ports 128 and 129 communicating with conduits 136 and 138, respectively, outlet port 130 and exhaust port 131 connected to a waste reservoir. A rotatable valve member 133 within valve housing 82 selectively connects inlet port 128 with outlet port 130, or connects inlet port 129 with outlet port 130 while it connects inlet port 128 with drain port 131. When extruderaccumulator 81 is employed, port 129' would be substituted for port 129.

Upon receiving a signal form the sequencing control 88, valve member 133 moves to a position interconnecting ports 128 and 130 so that molten plastic from extruder 86 is delivered to die 84.

The extruder 86 delivers one molten plastic material to die 84 at the same time the injection molding machine 80' has its injection ram proceeding in a withdrawal phase filling the injection cylinder with a second molten plastic. Upon receipt of another signal from sequencing control 88 timed by timer 91', valve member 133 shifts to a position connecting inlet port 129 and outlet port 130 and at the same time connecting inlet port 128 and drain port 131. In this position the molten plastic from extruder 86 is ported to exhaust through port 131. At the same time the sequencing control 88 initiates the injection cycle of injection molding machine 80' injecting the second molten plastic through line 138 to inlet port 129 and die 84, thereby providing an extrudate section constructed of molten plastic material from the injection molding machine 80'. This cycle is reversed by the timer 91' as desired providing alternate axial sections constructed of different materials.

When the extruder-accumulator 81 is provided in place of the injection molding machine 80', the actuator 93 is timed so that when the extruder 86 is supplying its molten plastic to die 84, the piston 91 is withdrawing molten plastic from extruder 85 into the accumulator cylinder 90 so that the net flow through the valve and the net waste are zero. When valve member 133 shifts connecting port 129' to the extruding die 84 and at the same time connecting extruder 86 to waste port 131, the actuator 93 is timed to initiate its injection stroke driving piston 91 upwardly and injecting molten plastic through line 95 to the inlet port 129' and die 84. The extruder 85 may thus continuously operate without producing any waste plastic whatever, if desired.

It should be noted that the injection molding machine 80' consists generally of an extruder serially feeding an injection cylinder having a ram therein. Therefore, the basic difference between injection molding machine 80' and extruder-accumulator 81 is that in the former the extruder and injector are connected in series whereas in the latter, the extruder and accumulator are connected in parallel flow arrangement. As used herein, the term injection device is used to denote both arrangements.

Instead of the extruder 86, an injection molding machine may be provided to further reduce the reclaimable waste material from the extruding apparatus. If 86 is an injection molding machine instead of an extruder it can be useable either with the injection molding machine 80' or the extruder-accumulator 81, as desired.

Figure 2:
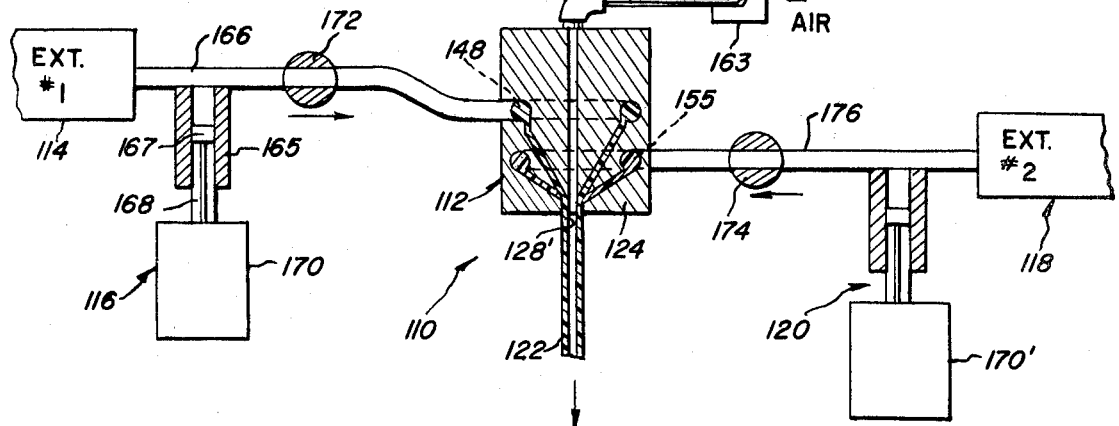
FIG. 2 is a schematic illustration of another extruding apparatus according to the present invention.

According to another embodiment of the present invention as shown in FIG. 2, an extruding apparatus 110 is illustrated generally including a composite die 112, a first extruder 114, a first accumulator-injector 116, a second extruder 118, and a second accumulator-injector 120. The extruders 114 and 118 selectively deliver molten plastic to the composite die 112 so that the resulting extrudate 122 has alternate axial sections of different materials.

Molten plastic from the extruder 114 enters inlet 148 in housing member 124 and passes out the die outlet 128'. In extruding tubing, the inside diameter and wall thickness of the extrudate is determined by the pressure of air supplied centrally through a passage in the die from air supply line 161 regulated by air control valve 163.

Molten plastic from extruder 118 is supplied to die inlet 155 from where it passes through a conical passage to the outlet 128'. Thus, molten plastic from extrudate 122 may be delivered to the die from either inlet 148 or inlet 155 as desired. In this manner sections of the extrudate are constructed of different material and thus have different characteristics. By varying the pressure of air in passage 161 the interior diameter, exterior diameter and wall thickness may be controlled.

The accumulator-injectors 116 and 120 are identical so that the description of the accumulator-injector 116 should be understood to apply equally to accumulator-injector 120. The accumulator-injector 116 consists of a cylinder 165 communicating freely with a conduit 166 interconnecting the extruder 114 with the die inlet 148. Slidable in the cylinder 165 is a piston 167 having a connecting rod 168 driven in reciprocable motion by an actuator 170. The actuator 170 drives piston 167 in a withdrawal phase, moving downwardly, drawing molten plastic from the extruder 114 into cylinder 165. After the withdrawal phase, actuator 170 moves piston 167 upwardly injecting the previously withdrawn molten plastic into passage 166 from where it passes to the die inlet 148. Actuator 170 is timed with respect to actuator 170' associated with accumulator-injector 120 such that the withdrawal phase of accumulator injector 116 occurs during the injection phase of the accumulator-injector 120 and similarly the injection phase of the accumulator-injector 116 occurs at the same time as the withdrawal phase of accumulator-injector 120.

For the purpose of preventing back flow into the cylinder 165 a stop valve 172 may be provided. Valve 172 is closed during the withdrawal phase of accumulator-injector 116 to prevent flow from the die into the cylinder 165 from extruder 114 directly into the die. Thus, all of the molten plastic in cylinder 165 comes directly from extruder 114. Valve 174 performs the same function with respect to accumulator-injector 120.

During operation of the extruding apparatus shown in FIG. 2, assume initially that valve 174 is open and that extruder 118 is delivering molten plastic to die inlet 155 and that the piston associated with the accumulator-injector 120 is injecting molten plastic into passage 176. It should be understood that both of the extruders 114 and 118 are constructed to operate at a predetermined rate throughout operation of the extruding apparatus 110.

With the die 112 receiving molten plastic from extruder 118 and accumulator-injector 120, the extrudate 122 produced during this interval consists solely of the material from extruder 118.

At the same time valve 172 is closed and the molten plastic from extruder 114 is drawn into cylinder 165 since accumulator-injector 116 is then in its withdrawal phase. After the inject stroke of accumulator-injector 120 is complete valve 174 closes and valve 172 opens so that molten plastic from extruder 114 is then delivered to inlet 148 of the die, thus changing the extrudate from one material to another. At the same time the accumulator-injector 116 begins its inject phase injecting the previously withdrawn molten plastic into passage 166 from where it passes to the die 112 along with the molten plastic from extruder 114.

At this time the accumulator-injector 120 is in its withdrawal phase at a rate sufficient to draw the entire output from the extruder 118 into the accumulator cylinder.

It should be understood that the relative sizes of the cylinders of accumulators 116 and 120 and the rates of movement of the pistons thereof in both the injection and withdrawal phases may be selected to produce an extrudate having predetermined lengths of each of the two different materials.

We claim:

1. An extruding apparatus, comprising: first extruder means for producing a first molten plastic extrudable material, second extruder means for producing a second molten plastic extrudable material, extruding die means receiving molten material from said first and second extruder means for producing an integral tubular extrudate having different characteristics along the length thereof, first means for conveying molten material from said first extruder means to said extruding die, second means for conveying molten material from said second extruder means to said extruding die, and an accumulator-injector communicating with said first conveying means for withdrawing molten material from said first conveying means to reduce the rate of flow of molten material from said first extruder means to said extruder die and for thereafter injecting said molten material into said first conveying means to increase the rate of flow of molten material from said first extruder means to said extruder die.

2. An extruding apparatus, comprising: first extruder means for producing a first molten plastic extrudable material, second extruder means for producing a second molten plastic extrudable material, extruding die means receiving molten material from said first and second extruder means for producing a tubular extrudate having different characteristics along the length thereof, first means for conveying molten material from said first extruder means to said extruding die, second means for conveying molten material from said second extruder means to said extruding die, first accumulator-injector means communicating with said first conveying means for withdrawing molten material from said first conveying means while the second conveying means is delivering molten material to said extruding die and for thereafter injecting said molten material into said first conveying means, and second accumulator-injector means communicating with said second conveying means for withdrawing molten material from said second conveying means while the first conveying means is delivering said first molten material to said extruding die and for thereafter injecting said molten material into said second conveying means.

3. An extruding apparatus as defined in claim 2, including a valve in said first conveying means between the first accumulator-injector and the extruding die for preventing flow from the die into the first accumulator as the accumulator is withdrawing molten material from the first conveying means.

4. An extruding apparatus as defined in claim 3, including a second valve in said second conveying means between the second accumulator-injector and the extruding die for preventing flow from the die into the second accumulator as the accumulator is withdrawing molten material from the second conveying means.

5. An extruding apparatus as defined in claim 2, including means for supplying air to the extruder die, and means to regulate the flow of air to the extruder die so that upon a change from one material to the other a predetermined extrudate configuration will be produced.

6. An extruding apparatus, comprising; a source of first molten material, a source of second molten material, at least one of said sources being an injection device, a die for extruding the first and second molten materials, valve means for selectively delivering the molten materials to the die including first inlet means for one of said materials, second inlet means for the other of said materials, outlet means connected to said die, exhaust means, a rotatable valve member in said valve means for selectively connecting said first inlet means with said exhaust means or said outlet means, and for selectively connecting said second inlet means to said outlet means when said first inlet means is connected to said exhaust means.

7. An extruding apparatus as defined in claim 6, wherein said valve member prevents mixing of the molten material from said first inlet means and said second inlet means.

* * * * *